US012668761B2

(12) United States Patent
Sautner et al.

(10) Patent No.: US 12,668,761 B2
(45) Date of Patent: Jun. 30, 2026

(54) PROCESS FOR THE RECOVERY OF AT LEAST ONE FRACTIONAL SUBSTANCE FROM VAPOURS DURING ALCOHOL REDUCTION OF A BEVERAGE, AND FRACTIONAL SUBSTANCE RECOVERY DEVICE

(71) Applicant: API SCHMIDT-BRETTEN GMBH & CO. KG, Bretten (DE)

(72) Inventors: Karlheinz Sautner, Angelbachtal (DE); Christoph Gueltlinger, Bretten (DE)

(73) Assignee: API SCHMIDT-BRETTEN GMBH & CO. KG, Bretten (DE)

( * ) Notice: Subject to any disclaimer, the term of this patent is extended or adjusted under 35 U.S.C. 154(b) by 602 days.

(21) Appl. No.: 18/015,069

(22) PCT Filed: Jun. 25, 2021

(86) PCT No.: PCT/EP2021/067554
§ 371 (c)(1),
(2) Date: Jan. 8, 2023

(87) PCT Pub. No.: WO2022/008268
PCT Pub. Date: Jan. 13, 2022

(65) Prior Publication Data
US 2023/0272316 A1 Aug. 31, 2023

(30) Foreign Application Priority Data
Jul. 8, 2020 (EP) ..................................... 20184715

(51) Int. Cl.
*C12H 3/02* (2019.01)

(52) U.S. Cl.
CPC ..................................... *C12H 3/02* (2019.02)

(58) Field of Classification Search
CPC .......... C12H 3/02; B01D 3/106; B01D 3/002; B01D 5/006; C12C 12/04
See application file for complete search history.

(56) References Cited

U.S. PATENT DOCUMENTS

| | | | |
|---|---|---|---|
| 4,978,547 A | 12/1990 | Petershans | |
| 5,034,238 A | 7/1991 | Seidlitz et al. | |
| 2018/0179480 A1 | 6/2018 | Kinner et al. | |

FOREIGN PATENT DOCUMENTS

| | | | |
|---|---|---|---|
| DE | 3843516 A1 | 6/1990 | |
| EP | 0557749 B1 | 5/1998 | |
| RU | 2835512 C1 * | 2/2025 | |

* cited by examiner

*Primary Examiner* — Vera Stulii
(74) *Attorney, Agent, or Firm* — KRIEGSMAN & KRIEGSMAN

(57) ABSTRACT

Process for recovering at least one fractional substance from vapours during the alcohol reduction of a beverage, and fractional substance recovery device for carrying out the process, in which an alcoholic beverage to be reduced in alcohol content is supplied to a degasser of a fractional substance recovery device, in which vapours are removed from the degasser and the alcoholic beverage passed through the degasser is supplied to a device for alcohol reduction, in which the vapours are fed to a plurality of fractional condensation stages which follow one another in series and in which at least one fractional substance is separated from the vapours under pressure and/or temperature, and in which the fractional substances separated in the respective fractional condensation stage are collected in a collecting container or are fed to an inoculation station, through which the separated fractional substances are fed in metered quantities to an alcohol-reduced drink.

13 Claims, 2 Drawing Sheets

Figure 1:
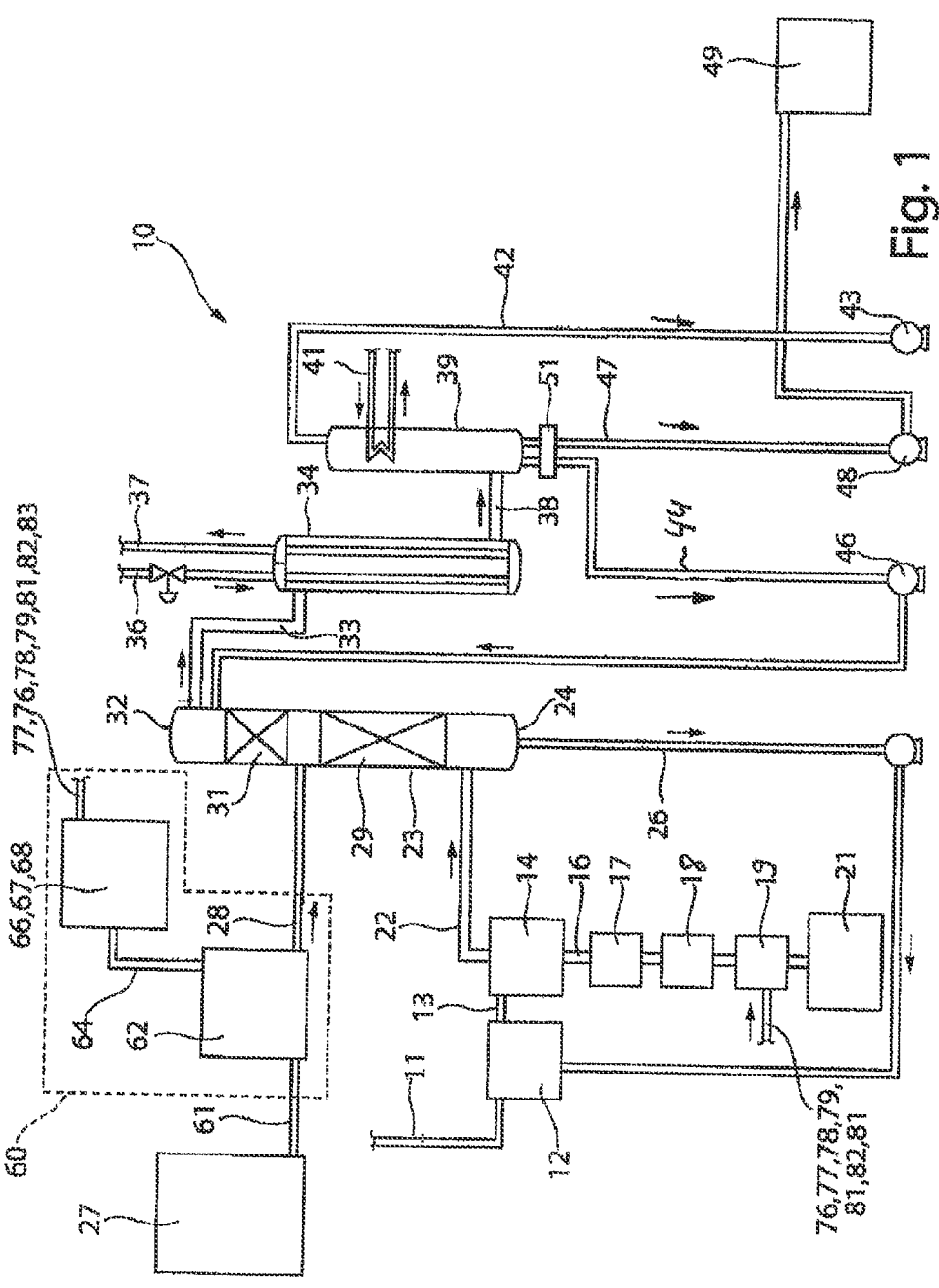

PROCESS FOR THE RECOVERY OF AT LEAST ONE FRACTIONAL SUBSTANCE FROM VAPOURS DURING ALCOHOL REDUCTION OF A BEVERAGE, AND FRACTIONAL SUBSTANCE RECOVERY DEVICE

The invention relates to a process for the recovery of at least one fractional substance from vapours during the alcohol reduction of a beverage and a fractional substance recovery device.

From DE 38 43 516 A1, for example, a device for the production of reduced-alcohol beverages is known. This device comprises a rectier. Vapours are separated by this rectifier. These vapours may include alcohol, and/or aroma substances. The alcohol is separated from the vapours. The vapours are cooled and can be returned to the rectifier. A reduced-alcohol or dealcoholised beverage is discharged from the rectifier, cooled and fed to a storage container via an inoculation station. In this inoculation station carbon dioxide is added to protect against oxidation. This device comprises a closed circuit so that the vapours discharged in the rectifier are returned to the rectifier after the alcohol has been separated out and after cooling.

From EP 0 557 749 B1, a device for enriching a beverage with highly volatile aroma substances is known, which is connected downstream of a device reducing the alcohol content of beverages. It is intended that a de-alcoholised beverage is fed to a gas scrubber. In a lower section of the gas scrubber, dealcoholised beverage is sucked off, cooled and fed back to the gas scrubber via a spraying device. Via a further branch, the dealcoholised product is removed from the gas scrubber and fed back to the gas scrubber via a vacuum pump, wherein volatile aroma substances are fed to the vacuum pump, which are enriched with the dealcoholised beverage in the vacuum pump and fed back to the gas scrubber. Aromatic substances present in the beverage are released into the environment via an upper discharge line in the gas scrubber.

The invention is based on the task of proposing a process for recovery of at least one fractional substance from vapours during the alcohol reduction of a beverage as well as a fractional substance recovery device in order to reduce the $CO_2$ load and/or to re-enrich the beverage with at least one desired fractional substance.

This task is solved by a process in which an alcoholic beverage is fed to a degasser of a fractional substance recovery device and vapours of the alcoholic beverage are discharged from the degasser. The alcoholic beverage treated by the degasser is fed to a further treatment, for example rectification, and the discharged vapours are fed to several fractional condensation stages following one another in series. In the fractional condensation stages at least one fractional substance is separated under reduced temperature and/or overpressure and the fractional substances are, for example, each collected in one or more collecting containers or are returned to the alcohol-reduced beverage in an inoculation station. The fractional condensation stages arranged in series allow partial condensation to take place so that different fractional substances are separated from the vapours in succession. This process makes it possible that the fractional substances desired for the enrichment of the reduced-alcohol beverage, in particular aroma substances or fragrances, can be specifically returned to the beverage, whereby a flavour enrichment and improvement of the reduced-alcohol beverage is achieved. Furthermore, this process can also enable the $CO_2$ contained in the alcoholic beverage to be recovered as a fractional substance prior to treatment of the alcoholic beverage, in particular alcohol reduction. This $CO_2$ can be returned to the reduced-alcohol beverage. This results in a reduction in the emission of $CO_2$ to the environment, as direct recirculation is possible. $CO_2$ and/or aromas and/or fragrances can also be recycled. This $CO_2$ obtained as a fraction can also be fed into another beverage or used for other purposes.

The term "reduced-alcohol beverage" also includes beverages in which the alcohol from the beverage is reduced to such an extent that these beverages are described as dealcoholised or non-alcoholic.

It is preferably intended that, in the fractional condensation stage, the vapours supplied are charged with a pump, in particular a vacuum pump, and compressed to a higher pressure and then cooled with at least one cooling medium, in particular a heat exchanger, and subsequently at least one fraction is separated by a separator. By means of this fractional condensation stage, at least one desired fractional substance can be separated from the vapours depending on the pressure and/or temperature. The vapours discharged from the degasser are substances containing alcohol, fragrances, aromas and $CO_2$. On the one hand, this enables the alcohol and/or water to be removed from the vapours and discharged as a waste product. In addition, the individual fragrances and/or aromas and/or $CO_2$ can be separated out and then optionally returned to the dealcoholized beverage.

Furthermore, the fractional condensation stages, which are arranged in series, are preferably controlled with increasingly raising pressure and preferably cooled down to a constant temperature range before leaving the condensation stage. This enables a specific control for the separation of water, alcohol, $CO_2$, fragrances and/or aromas.

It is preferably intended that in a first fractional condensation stage the vapours coming from the degasser are compressed from, for example, 100 mbar to, for example, 1.5 to 2 bar and then cooled to a temperature of, for example, 10° C. to 20° C. The vapours coming out of the degasser can have a temperature of up to 50° C., for example. The vapours are in gaseous state and include water, alcohol, $CO_2$, fragrances and aromas.

In this first fractional condensation stage, for example, the water and alcohol contained in the vapours can be condensed out.

Furthermore, it is preferably provided that in a second fractional condensation stage, which is downstream of the first fractional condensation stage, the remaining vapours are further compressed from, for example, 1.5 to 2 bar to, for example, 3 to 5 bar and are then preferably cooled to a temperature of 5 to 10° C. In this second fractional condensation stage, fragrances and/or aromas, for example, can be separated as fractional substances.

Furthermore, it is preferably provided that a third fractional condensation stage is provided in which the remaining vapours are compressed from, for example, 3 to 5 bar to, for example, 10 to 12 bar and are then preferably cooled to a temperature of 5 to 10° C. This makes it possible for $CO_2$ to remain as the fractional substances, which contains virtually no more fragrances and/or aromas. This $CO_2$ as fractional substance can in turn be added to the reduced-alcohol beverage via the inoculation station.

Furthermore, the fractional substances separated by the fractional condensation stages are preferably fed through the inoculation station to an alcohol-reduced beverage which is finished by the alcohol reduction device and has been removed from the alcohol reduction process. Thus the finished beverage can be enriched with the fractional substances separated from the fractional substances recovery device.

Furthermore, the proportions of the separated fractional substances that are added to the finished, reduced-alcohol beverage are preferably selected and adjusted in the inoculation station. Thus, a sensory enrichment can be achieved in a simple way.

The task on which the invention is based is further solved by a fractional substance recovery device for recovering at least one fractional substance from vapours during the alcohol reduction of a beverage, which comprises a degasser and several fractional condensation stages downstream of the degasser, which are arranged in series one behind the other. In each of the fractional stages at least one fractional substance can be separated under pressure, i.e. at a pressure and/or temperature which is higher than the ambient pressure, and discharged through a separator, in particular condensate discharge. This enables specifically selected fractional substances to be optionally returned to the reduced-alcohol or dealcoholised beverage and other fractional substances to be disposed of as waste products. In addition, it is also possible to enable CO2 recovery, thus reducing environmental pollution. The CO2 contained in the vapours, which is removed by the degasser, can be returned to the finished beverage. The vapours can be taken from the original beverage or from a different beverage.

Advantageously, a fractional condensation stage comprises a pump, in particular a vacuum pump, and downstream of this at least one cooler, which can be designed as a heat exchanger. In addition, the at least one cooler is followed by a separator to remove the separated fraction from the fractional condensation stage. Such a fractional condensation stage makes it possible, through the specific adjustment of a working pressure or overpressure and temperature, to separate individual or desired fragrances and/or aromas and/or alcohol and/or water and/or CO2.

Furthermore, it is preferably provided that a fractional condensation stage comprises at least two coolers and that each cooler is followed by a separator for at least one fractional substance. This may enable two or more fractional substances to be condensed separately from each other within a fractional condensation stage.

Figure 2:
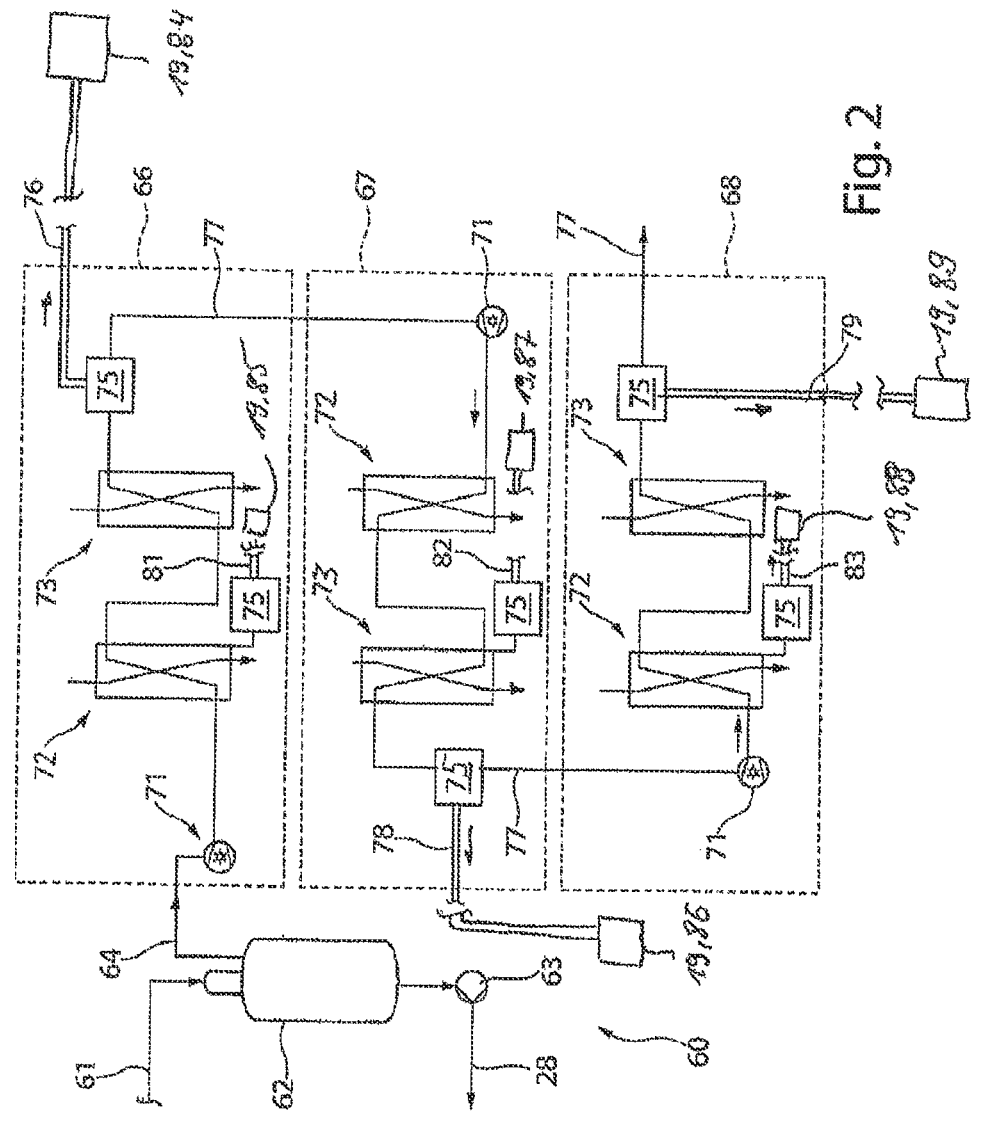

The invention as well as other advantageous designs and further developments of the same are described and explained in more detail below on the basis of the examples shown in the drawings. The features to be taken from the description and the drawings can be applied individually on their own or in combination with each other. It is shown:

FIG. 1 a schematic view of a device for the production of reduced-alcohol beverages, and FIG. 2 is a schematic view of a fractional substances recovery device.

A device 10 for the production of reduced-alcohol beverages comprises a heat exchanger 12, to which steam at a temperature of, for example, 110° C. is fed via a line 11 to a first circuit. In the second circuit of the heat exchanger a line 13 is provided leading to a separator 14. From the bottom of the separator 14 a line 16 emerges, which carries the non-alcoholic beverage. The non-alcoholic beverage is preferably wine or beer. In the outlet line there is a heat exchanger 17, which cools down the temperature of the finished product and serves the heat economy. In addition, line 16 contains a cooler 18, which cools the finished product down to, for example, 5° C. Finally, there is an inoculation station 19, which is fed with fractional substances that are separated from vapours of the alcoholic beverage by a fraction recovery device 60 (FIG. 2). This is explained below. Downstream of the inoculation station 19 is a storage container 21 for receiving the finished product, i.e. the reduced-alcohol or dealcoholised beverage, which is enriched with fractional substances via the inoculation station 19.

Starting from the head of the separator 14, a line 22 runs which carries warm, nonseparated vapours and leads to the lower part of a tower 23, which forms a rectifier. From the bottom 24 of the tower 23 there is a line 26 leading to the second circuit of the heat exchanger 12. This circuit is thus closed.

The beverage to be dealcoholised or reduced in its alcohol content, such as wine, beer or sparkling wine, is stored in a storage tank 27. From the storage tank 27, a line 61 leads to the fractional material recovery device 60. This line 61 leads in particular to a degasser 62 of the fractional material recovery device 60. From the degasser 62, a line 28 leads to a heat exchanger 17 in the second circuit of the device. Via line 28 the alcoholic beverage, which is reduced by vapours by the degasser 62, is preferably fed to a heat exchanger not shown in detail, whereby the beverage is cooled down before the beverage is fed in the centre of the tower 23. In tower 23, which is preferably made of stainless steel, a higher first packing 29 and a second packing 31 are provided. The two packings are spaced apart. Packing 29 has a distance from the inlet of line 22 and thus also a considerable distance from the bottom 24.

Line 28 enters between the two packings 29, 31. Packing 31 has a distance from the head 32 of the tower. A line 33 of considerable diameter leaves the upper part of the head 32, which carries vapours containing alcohol, fragrances and aromas. The temperature in head 32 is, for example, 30° C. This corresponds to about 44 mbar. The temperature in tower 23 above floor 24, for example, is 39° C., so that a pressure of 70 mbar is present. In the steady state of the rectifier, line 33 carries 80% of the alcohol, whereby "alcohol" is always understood to mean "ethyl alcohol". Line 33 leads to a condenser 34, which is fed via line 36 with cooling water obtained by ambient cooling and evaporation cooling. Heated water is discharged through one line 37.

In the condenser 34, the vapours fed to the head are not yet condensed, which is why the condenser 34 is fed via a line 38 to a cooler 39. Its cooling system is supplied with ice water via a pipe 41. A vacuum line 42 leads into the head of the cooler 39, which is connected to a vacuum pump 43 and which also generates the vacuum present in tower 23. From the bottom of the cooler 39, a line 44 exits, which carries liquefied alcohol, fragrances, aromas, higher alcohols in liquid form, with a concentration not exceeding 82%. The percentage may be between 20 and 80% depending on the dealcoholisation effort. The liquid is fed by a pump 46 to head 32 at a level not exceeding the outlet of line 33 and above the second package 31.

Parallel to line 44, a line 47 leaves the bottom of the cooler. This line carries the alcohol that is not needed for feedback and is finally discharged, which is pumped to an alcohol tank by a pump 48.

A controller 51 determines the quantity ratio in lines 44 and 47. When the device 10 is started up, line 47 remains closed at first due to its action, and this until the alcohol content in lines 44, 33, 38 has reached the desired level, e.g. 80%. The regulator 51 prevents a further increase of the alcohol content by releasing line 48, to the extent that it is guaranteed that it maintains the desired level on the feedback path of the alcohol percentage.

FIG. 2 shows a schematic enlargement of the fractional substance recovery device 60. The line 61 leads the alcoholic beverage from the storage tank 27 to the degasser 62. From an underside of the degasser 62 the degassed alcoholic beverage is fed via a pump 63 through the line 28 to the heat exchanger 17. Vapours of the alcoholic beverage are removed from the degasser 62. These vapours are available in gas or vapour form. For example, they can have a temperature of 40 to 50° C. The vapours comprise water, aromas, fragrances, $CO_2$ and alcohol.

The vapours are fed via line 64 to one or more fractional condensation stages 66, 67, 68 connected in series. In this embodiment, the fractional substances recovery device 60 comprises, for example, the three functional condensation stages 66, 67, 68 shown. There may be fewer or more such fractional condensation stages.

The fractional condensation stages 66, 67, 68 are preferably of the same design. For this reason, the structure of the fractional condensation stage 66 is described, which also applies to the others. Therefore, the same reference numbers were used for the same components.

On the inlet side a pump 71, especially a vacuum pump, is provided by which the supplied vapours are compressed. Subsequently, the compressed vapours are cooled by one or more successive coolers 72, 73, especially heat exchangers. The compressed and cooled vapours are then fed to a separator 75, which has a line 76, via which the fractional substance separated in the respective fractional condensation stage is discharged. The separated fractional substances can be fed into one or each of the separate collection containers 84, 85 or collection containers for any further use or the inoculation station 19. The remaining vapours are fed via line 77 to a subsequent fractional condensation stage.

If only one fractional condensation stage is provided, the separator 75 can be omitted so that line 77 leads directly to the inoculation station 19.

With the fractional substance recovery device 60 shown, water and alcohol can be separated in the first fractional condensation stage 66 due to compression of the vapours to, for example, 1 to 2 bar and subsequent cooling to, for example, 40° C. to 50° C., and discharged into a waste or collection container via line 76.

In a subsequent second fractional condensation stage 67, the remaining vapours, which have been reduced in terms of water and alcohol, are further compressed, for example to 3 to 5 bar, and then cooled with one or more coolers 72, 73. At least one fragrance or aroma can be removed from the separator 75 via a line 78, which can be fractionated at these set conditions within the condensation stage. This fragrance or aroma can be fed to the injection station 19 or also collected in a collecting tank 86. Via the separator 75 downstream of the second cooler 73, a further fraction can be fed to the inoculation station 19 or a collecting tank 87. Via line 77, the remaining vapours are fed, for example, to a third fractional condensation unit 68. By means of the pump 71 a compression to e.g. 10 to 12 bar can be achieved. In the separator 75 separated fractional substances, e.g. from the first and second cooler 72, 73 can be fed via line 79, 83 to the inoculation station 19 or a collecting container 88. 89. For example, $CO_2$ or slightly enriched $CO_2$ may remain in the third fractional condensation stage, which can be fed via line 77 to the inoculation station 19.

By means of the described fractional substance recovery device 60, a specific separation of individual fractional substance from the vapours can be controlled depending on the number of fractional condensation stages. These can be optionally returned to the reduced-alcohol or dealcoholised beverage or disposed of. In particular, a recirculation of $CO_2$ and/or aroma substance is provided for. This allows an enrichment of taste and/or a minimisation of $CO_2$ pollution.

The invention claimed is:

1. Process for recovering at least one fractional substances from vapours during the alcohol reduction of a beverage,
   in which an alcoholic beverage is supplied to a degasser of a fractional substance recovery apparatus,
   in which vapours are removed from the degasser and the alcoholic beverage passed through the degasser is fed to a device for reducing alcohol,
   in which the vapours are fed to a plurality of fractional condensation stages which follow one another in series and in which at least one fractional substance is separated from the vapours under pressure and/or temperature, and
   in which the fractional substances separated in the respective fractional condensation stage are collected in a collecting container or fed to a inoculation station, through which one or several separated fractional substances are fed in dosed form to a reduced-alcohol beverage.

2. Process according to claim 1, wherein in the fractional condensation stage the supplied vapours are pressurized via a pump, preferably vacuum pump, and subsequently cooled with at least one cooler, in particular heat exchanger, and subsequently at least one fractional substance is separated via a separator.

3. Process according to claim 1, wherein the vapours are pressurized with increasing pressure in the fractional condensation stages following one another in series.

4. Process according to claim 1, wherein in a first fractional condensation stage the vapours are compressed from 100 mbar to 1.5 to 2 bar.

5. Process according to claim 1, wherein in a second fractional condensation stage, which is connected downstream of the first condensation stage, the remaining vapours are compressed from 1.5 to 2 bar to an increased pressure of 3 to 5 bar.

6. Process according to claim 1, wherein in a third fractional condensation stage the remaining vapours of 3 to 5 bar are compressed to an increased pressure.

7. Process according to claim 1, wherein before the alcohol reduction of the alcoholic beverage, the vapours of the alcoholic beverage are removed.

8. Process according to claim 1, wherein the fractional substances separated by the fractional condensation stages are fed through the inoculation station to an alcohol-reduced beverage which is finished by the alcohol reduction apparatus and has been discharged from the alcohol reduction process.

9. Process according to claim 1, wherein in the inoculation station the amount of the separated fractional substances from the fractional substance recovery device, which are supplied to the finished alcohol-reduced beverage, are selected and adjusted.

10. Process according to claim 3, wherein vapours are pressurized with increasing pressure in the fractional condensation stages following one another in series and are cooled to a constant temperature range of the fractional condensation stages before leaving the respective condensation stage.

11. Process according to claim 4, wherein in the first fractional condensation stage the vapours are cooled to a temperature of 40° C. to 50° C.

12. Process according to claim 5, wherein in the second fractional condensation stage, which is connected downstream of the first condensation stage, the remaining vapours are cooled to a temperature of 5° C. to 10° C.

13. Process according to claim 6, wherein in the third fractional condensation stage the remaining vapours are cooled to a temperature of 5° C. to 10° C.

* * * * *